Aug. 25, 1953     C. M. GOODSPEED     2,650,102
REVERSIBLE WAGON DRAWBAR
Filed Sept. 14, 1950     2 Sheets-Sheet 1
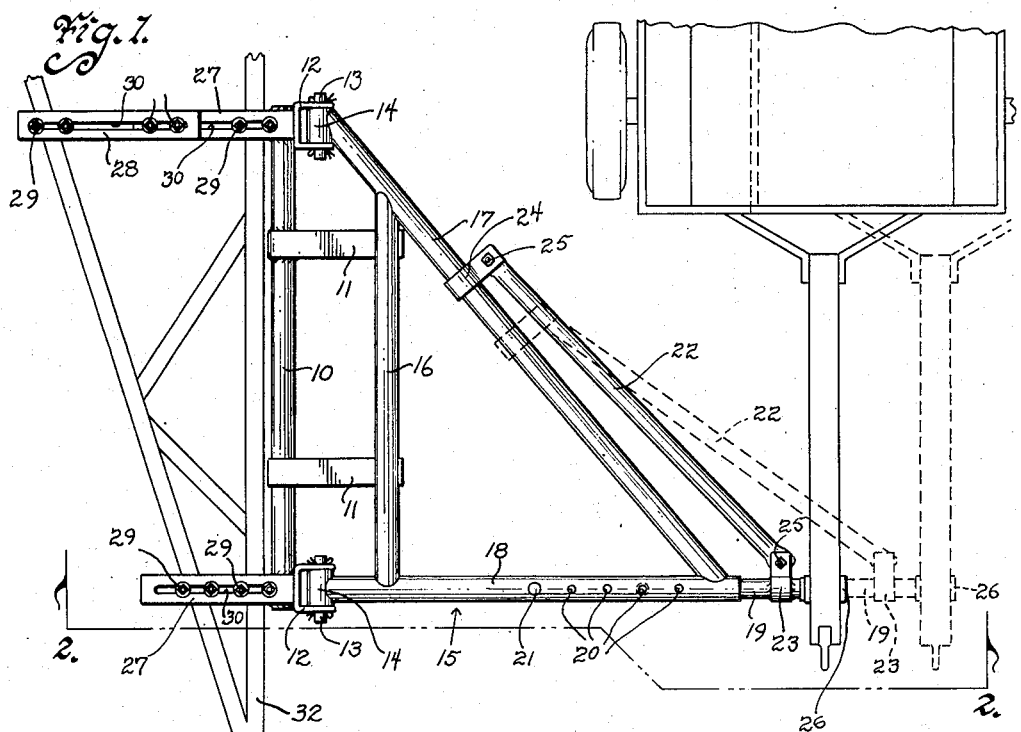
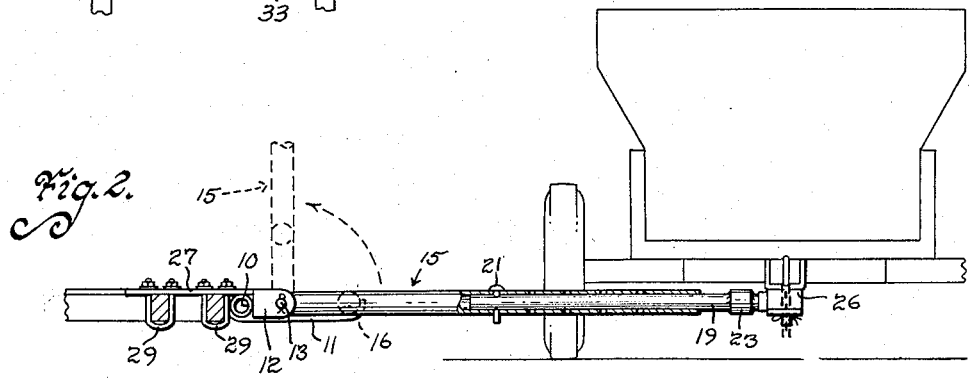
Inventor
Carl M. Goodspeed
by M. Talbert Dick
Attorney
Witness
Edward P. Seeley

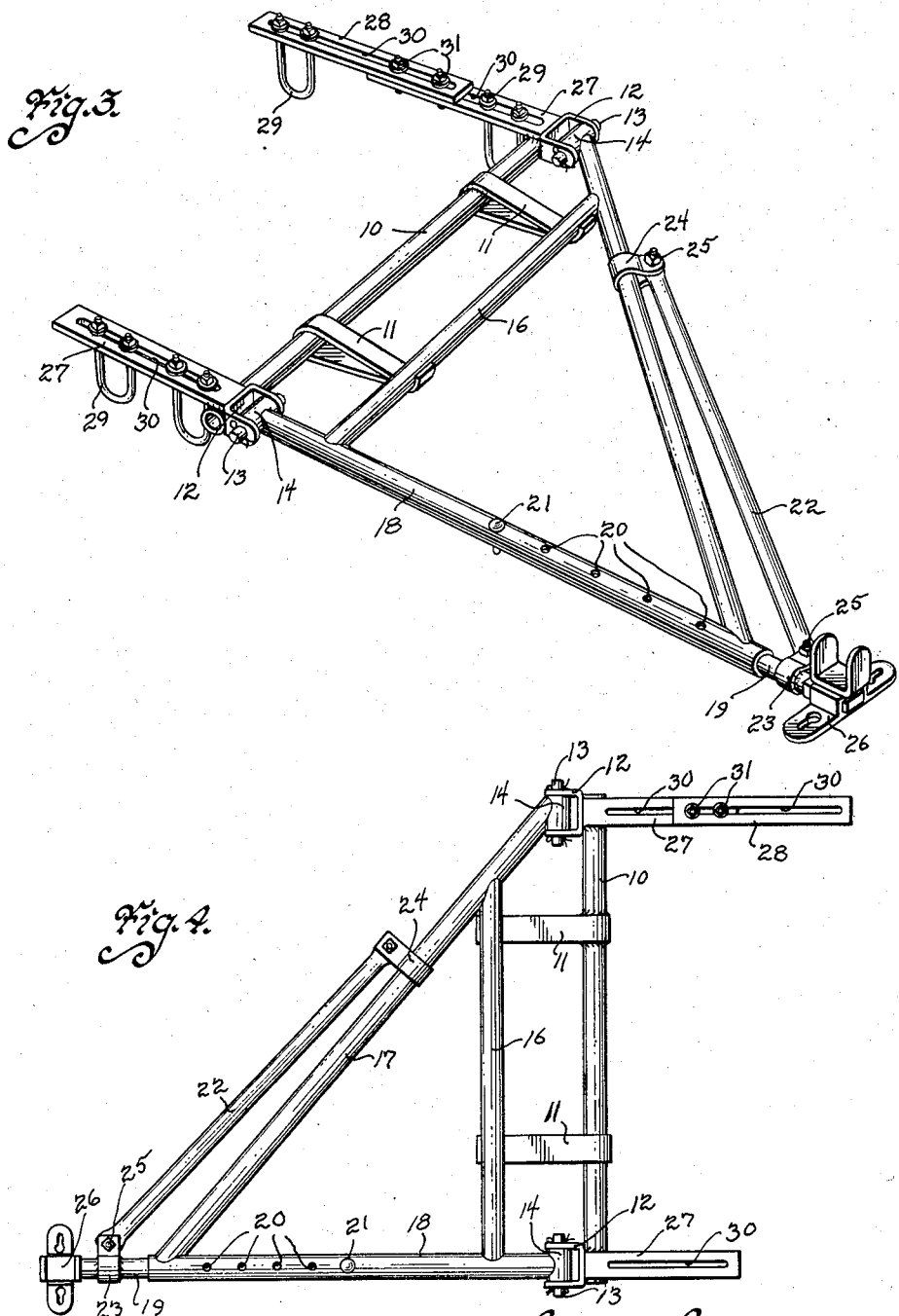

Patented Aug. 25, 1953

2,650,102

UNITED STATES PATENT OFFICE 2,650,102

REVERSIBLE WAGON DRAWBAR

Carl M. Goodspeed, Fort Dodge, Iowa

Application September 14, 1950, Serial No. 184,816

2 Claims. (Cl. 280—33.44)

My present invention is an improvement on my combine wagon hitch on which Letters Patent No. 2,512,097 were granted to me on June 20, 1950. Specifically I have improved my hitch therein described and claimed by making it of such a structure that it may be reversed and used to tow wagons on either side of the combine without the necessity of making any structural change in the device.

My existing patent referred to above describes a hitch for use with a combine that makes it possible to tow a wagon at one side of the combine as that machine is doing its work. Towing a wagon in such a position is a great advantage in that the grain may be deposited therein as soon as the combine has separated it from the chaff. My former structure was not capable of being used on either side of a combine, however, as its structure required that it be designed for either right or left hand towing but not both. It was necessary using this structure therefore to make separate hitches for right and left hand towing. By making a major improvement in my device, it became adaptable to either right or left hand towing which of course, simplified the production problem as only one form or any one part need be made. A further improvement I have made in my device is a new and improved brace for the length of the drawbar that extends from the frame that is secured to the combine. My new brace permits the construction of the device to be less bulky without sacrificing strength.

In view of the foregoing, therefore, it is the principal object of my invention to provide a drawbar for securing a wagon to a combine that may be arranged to pull a wagon on either side of a combine without the need of altering the structure of the hitch.

It is a further object of my invention to provide a drawbar for securing a wagon to a combine that has an adjustment as to the length of the drawbar extending from the combine that is of such a structure that it is strong without being bulky.

It is a further object of my invention to make such a wagon hitch for use with a combine that is durable in use and economical to manufacture.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a top view of my wagon drawbar secured to the tongue of the combine shown in fragment and which is shown secured to a fragment of a tractor drawbar. Broken lines illustrate the side-ways adjustment of the outer end of the drawbar for the wagon to permit the adjustment of the distance to the side of the combine that the wagon is towed.

Fig. 2 is a front view of my wagon drawbar taken on the line 2—2 of Fig. 1 with broken lines illustrating the folded position of the drawbar.

Fig. 3 is a perspective view of my drawbar arranged for left hand towing of the wagon with respect to the combine as the two are viewed from the rear.

Fig. 4 is a top view of the drawbar arranged for right hand towing of the wagon with respect to the combine as the two are viewed from the rear.

Referring to the drawings I have used the numeral 10 to designate the main longitudinal frame rigid member which may be made of any suitable material and here shown as a hollow tube for strength and lightness. Two stop members designated 11 are rigidly secured to the main frame member 10 in any suitable manner in this case shown as by welding. At each end of the main frame 10 is a U-shaped bracket designated 12 which is suitably bored to receive the clevis pins 13 on which the stub tube bearing members 14 of the hinged frame or drawbar generally designated 15 are free to hinge. The hinge frame takes the form of a leaning A with the stop engaging brace member 16 rigidly secured at its respective ends to the long side member 17 and the short side member 18. The side members are secured together at one end and at their opposite respective ends carry the two bearing members 14. All the hinge frame members may be made from any suitable substance such as tubular metal and they are rigidly secured together in any appropriate manner as by welding. At least short side member 18 should be of hollow construction if my form of adjustable drawbar is to be constructed as the drawbar rod designated 19 slidably fits inside the short side 18. A series of holes designated 20 are arranged in the short side 18 and another in drawbar rod 19. The clevis pin 21 may then be used to secure drawbar rod 19 and short side 18 against sliding movement with respect to each other. The numeral 22 designates the sliding brace member for the drawbar rod 19. A fixed collar member indicated by the numeral 23 is rigidly secured to the drawbar rod 19 and pivotally holds and supports one end of the sliding brace 22. The other end of the sliding brace is pivotally secured between the ends of the sliding collar 24 that may be moved along the length of hinge frame long side member 17. The hinging or pivoting action at the collars may be provided for in any one of a number of ways, but the nut and bolt assemblies 25 are particularly appropriate, as will be appreciated from reading the discussion of the operation of my hitch. A wagon tongue securing means designated 26 is pivotally secured to the end of the drawbar. As this wagon tongue securing means is substantially the same as that I employ in my combine wagon hitch on which Letters Patent have already issued and which I have already mentioned in this specification, I will not describe it in detail. It should be stated that member 26 may be removed for towing short tongue wagons, however. Extending from the main frame 10 in the opposite direction from that taken by the hinge frame are the securing members 27 that permit the drawbar main frame to be attached to the combine. These securing members are rigidly attached to the main frame in any suitable manner here shown illustratively as welded again. A third securing means or member 28 is provided that is substantially the same as the two main securing members except that it is not secured to the main frame directly or rigidly, but may be secured to either of the main frame members by any appropriate means. The U-bolts 29 serve to secure the whole drawbar assembly to the combine, and the securing bars are provided with the slot 30 to permit any necessary adjustment of the drawbar to any particular combine. When attaching the auxiliary third securing member to the appropriate one of the main securing members, two additional nuts and bolts designated 31 are used to connect the auxiliary securing member to the main securing member.

Having thus described my invention, I will now describe its use or operation pointing out particularly how my improvements make the new unit more valuable than the combine wagon hitch described in my earlier patent. To prepare the hitch for use in towing a wagon to the left of the combine as the two units are viewed from the rear, the drawbar is set up as shown in Fig. 3. The U-bolts are then clamped around the combine tongue 32 as shown in Fig. 1. It is easy to see from an examination of that figure how the wagon is drawn along with the combine and just to the left of it. As is explained in my earlier patent, the wagon may be adjusted as to the distance from the prime mover that it is towing the combine which prime mover is represented by the drawbar 33. The broken line in Fig. 1 shows the means for adjusting the lateral positioning of the wagon with respect to the combine. By loosening the bolt assembly 25 in the sliding collar 24 and removing clevis pin 21, drawbar rod 19 may be moved outwardly or inwardly within the limits provided by the holes 20. A similar adjustment was provided in my earlier combine wagon hitch but only the drawbar rod was slidably mounted and there was no brace member corresponding to the sliding brace 22. The structure of the main and hinge frames was required to be much larger and stronger, therefore, in order for the drawbar rod of the older device that corresponds to my present drawbar rod 19 to be strong enough to tow a wagon particularly when it is loaded and the ground or other supporting surface is at all rough. With my new and improved sliding brace, however, it is possible to make an adjustable frame to support and strengthen the drawbar rod 19 in either a close-in position or in an extended position that will still have the strength to pull a wagon heavily loaded and over rough ground, even though the drawbar is made from much lighter material than is possible when using the structure shown and described in my earlier patent on a combine wagon hitch referred to above. This sliding brace structure is one of the new and novel improvements in my new wagon hitch for use with combines. When the proper adjustment is completed, the bolt and nut assemblies 25 may then be tightened to secure greater rigidity.

The other feature of my new and improved wagon hitch is the fact that it may be easily and quickly adjusted for use in either left or right-hand towing. The arrangement of the hitch for left hand towing has already been explained. To arrange the hitch for right-hand towing, the frame member 10 is walked around 180 degrees. The auxiliary securing member is removed from the one of the main securing members to which it was secured for the left hand towing and is re-secured to the other main securing member. The main frame 10 may then be attached to the tongue of the combine as shown in Fig. 1 except that the frame will be on the opposite side. It should be noted that the frame 10 was walked around in a plane, however, and that the stop members 11 have their curved ends facing upwardly just as they did for left hand towing. The two positions may be compared in an examination of the Figs. 3 and 4 simultaneously. It will also be noted that the stop members 11 are equal distances from the U-shaped ends main frame 10 to permit the slanting long side member 17 to be arranged near either of the stops. Because slanting long side member 17 extends from its bearing member 14 at a much sharper angle than short side 18, stop members 11 must be spaced a considerable distance in from the ends of the main frame to permit the auxiliary frame to be secured with long side 17 adjacent either end of the main frame. Thus, stops 11 must be spaced at least as far from the ends of the frame as is necessary to clear side member 17 regardless of which way the auxiliary frame and the main frame are secured together. At the same time, stops are spread as far apart as possible to permit as much stability as is consistent with the reversible character of the frames. Hinge frame 15 may, therefore, be turned around to place short side 18 to the rear if that should prove either necessary or desirable. This switch of the hinge A-frame adds another element of adjustment to the forward and back adjustment of the wagon with respect to the combine. In short, the hitch is made up of universal parts that may be used for towing from either side of the combine with an enormous range of longitudinal adjustments for the position of the wagon and combine with relation to each other and considerable lateral adjustment of the relative positions of these two units as well.

Although the adjustment of the hitch requires some effort the same is not prohibitive because the adjustments for any one performance of the hitch will serve for a considerable amount of work. For example, the hitch is properly adjusted to fit on a particular combine and may then be left in that adjustment until it is desired to be used with a different combine. Even with a different combine that may require a different adjustment for the longitudinal position of the wagon with respect to the combine, the adjustment of the hitch may not have to be changed with respect to the side of the combine on which the wagon is to be towed. The major advantage of my universal hitch is that only one set of parts need be made to accommodate any combine wagon towing combination. For this reason the device can be made much more economically than could my earlier hitch which had to be made either for right or left hand towing of the wagon with respect to the combine but could not be made to work for both. It should be clear therefore that I have contributed to the art by making my earlier hitch, that has itself been recognized to the extent that Letters Patent have issued on it, much more easily and economically available to the farmers of our country.

Some changes may be made in the construction and arrangement of my reversible wagon draw bar without departing from the real spirit and purpose of my invention, and it is my intention to cover by my claims, any modified forms of structure or use of mechanical equivalents which may be reasonably included within their scope.

I claim:

1. In a hitch for towing a wagon at one side of a combine, a main frame, a means on said main frame for securing it to a combine tongue at times, a secondary frame hingedly secured to said main frame; said secondary frame generally in the shape of an A and having the forward side and the cross bar forming a right angle with each other; and said forward side of said secondary frame being hollow, stop members rigidly secured to said main frame to limit the hinging movement of said secondary frame with respect to said main frame, a drawbar rod slidably fitting inside said hollow forward side of said secondary frame, a means for securing said drawbar rod in a fixed relation to said secondary frame at times, and a brace member hingedly secured by one of its ends to said drawbar rod near its outer end and slidably and hingedly secured at its other end to the rear side of said secondary frame; said stops on said main frame being secured to said main frame at equal distances from its respective ends.

2. In a hitch for towing a wagon at one side of a combine, a main frame, a means on said main frame for securing it to a combine tongue at times, a secondary frame hingedly secured to said main frame; said secondary frame generally in the shape of an A and having the forward side and the cross bar forming a right angle with each other; and said forward side of said secondary frame being hollow, stop members rigidly secured to said main frame to limit the hinging movement of said secondary frame with respect to said main frame, a drawbar rod slidably fitting inside said hollow forward side of said secondary frame, a means for securing said drawbar rod in a fixed relation to said secondary frame at will, and a brace member hingedly secured by one of its ends to said drawbar rod near its outer end and slidably and hingedly secured at its other end to the rear side of said secondary frame; said stops on said main frame being secured to said main frame at equal distances from its respective ends, and the shortest distance from either of said stops to an end of said main frame being greater than that distance from the rear end of said auxiliary frame to the point where the cross bar of said A-shaped auxiliary frame engages the rear side of said A-shaped auxiliary frame.

CARL M. GOODSPEED.

References Cited in the file of this patent

UNITED STATES PATENTS

| Number | Name | Date |
|---|---|---|
| 1,712,974 | Venard | May 14, 1929 |
| 1,725,168 | Willis | Aug. 20, 1929 |
| 1,728,098 | Bork | Sept. 10, 1929 |
| 1,941,670 | Everett | Jan. 2, 1934 |
| 2,512,097 | Goodspeed | June 21, 1950 |